United States Patent
Tsuchida et al.

(10) Patent No.: US 12,353,942 B2
(45) Date of Patent: Jul. 8, 2025

(54) RFID TAG COMMUNICATION DEVICE

(71) Applicant: Toshiba Tec Kabushiki Kaisha, Tokyo (JP)

(72) Inventors: Sunao Tsuchida, Mishima Shizuoka (JP); Sadatoshi Oishi, Fuji Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/808,294

(22) Filed: Aug. 19, 2024

(65) Prior Publication Data

US 2024/0412013 A1 Dec. 12, 2024

Related U.S. Application Data

(63) Continuation of application No. 18/185,990, filed on Mar. 17, 2023, now Pat. No. 12,093,773, which is a (Continued)

(30) Foreign Application Priority Data

Jul. 1, 2020 (JP) ................................ 2020-113942

(51) Int. Cl.
 *G06K 7/10* (2006.01)
(52) U.S. Cl.
 CPC ..... *G06K 7/10356* (2013.01); *G06K 7/10267* (2013.01)
(58) Field of Classification Search
 None
 See application file for complete search history.

(56) References Cited

U.S. PATENT DOCUMENTS

| 8,111,142 B2 | 2/2012 | Mizukawa |
| 10,241,492 B2 | 3/2019 | Oishi |

(Continued)

FOREIGN PATENT DOCUMENTS

| JP | 2007158993 A | 6/2007 |
| JP | 2011091541 A | 5/2011 |

(Continued)

OTHER PUBLICATIONS

Japanese Office Action dated Jan. 30, 2024, mailed in counterpart Japanese Application No. 2020-113942, 16 pages (with translation).

*Primary Examiner* — Thien M Le
*Assistant Examiner* — April A Taylor
(74) *Attorney, Agent, or Firm* — Kim & Stewart LLP

(57) ABSTRACT

According to an embodiment, a wireless tag communication device includes a first antenna that emits radio waves towards a first region of a conveyance path for wireless tags and a second antenna that emits radio waves towards a second region of the conveyance path on downstream of the first region along the conveyance path. A shield prevents the radio waves emitted from the first antenna from reaching a first portion of the first region while permitting the radio waves to reach a second portion of the first region. A controller is configured to select a tag ID read via the first antenna as a target tag ID, designate the target tag ID by communication via the second antenna, and then write tag information via the second antenna to the wireless tag corresponding to the designated target tag ID.

14 Claims, 11 Drawing Sheets

Related U.S. Application Data continuation of application No. 17/314,594, filed on May 7, 2021, now abandoned.

(56) References Cited

U.S. PATENT DOCUMENTS

| | | | |
|---|---|---|---|
| 12,093,773 B2* | 9/2024 | Tsuchida | G06K 17/0025 |
| 2006/0244607 A1* | 11/2006 | Liu | G06K 7/10356 340/572.7 |
| 2008/0094179 A1 | 4/2008 | Di Domenico | |
| 2008/0094221 A1 | 4/2008 | Sugano | |
| 2013/0015959 A1 | 1/2013 | Sano | |
| 2016/0283758 A1 | 9/2016 | Watanabe | |
| 2018/0341243 A1 | 11/2018 | Oishi | |
| 2020/0401773 A1 | 12/2020 | Bufe | |
| 2021/0075097 A1 | 3/2021 | Tsuchida | |
| 2022/0004724 A1 | 1/2022 | Tsuchida | |
| 2023/0229875 A1 | 7/2023 | Tsuchida | |

FOREIGN PATENT DOCUMENTS

| | | | |
|---|---|---|---|
| JP | 2012243217 A | 12/2012 | |
| JP | 2015092310 A | 5/2015 | |
| JP | 2018163470 A | 10/2018 | |
| WO | 2019145319 A1 | 8/2019 | |

* cited by examiner

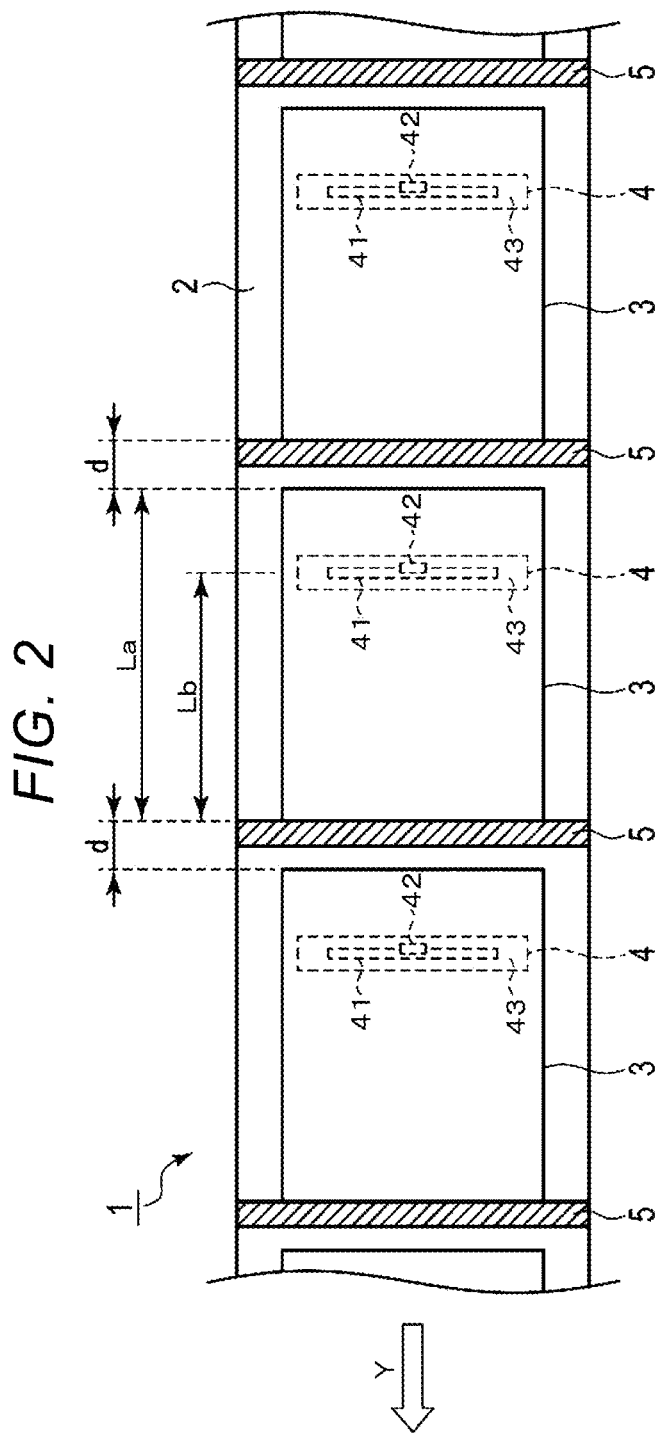

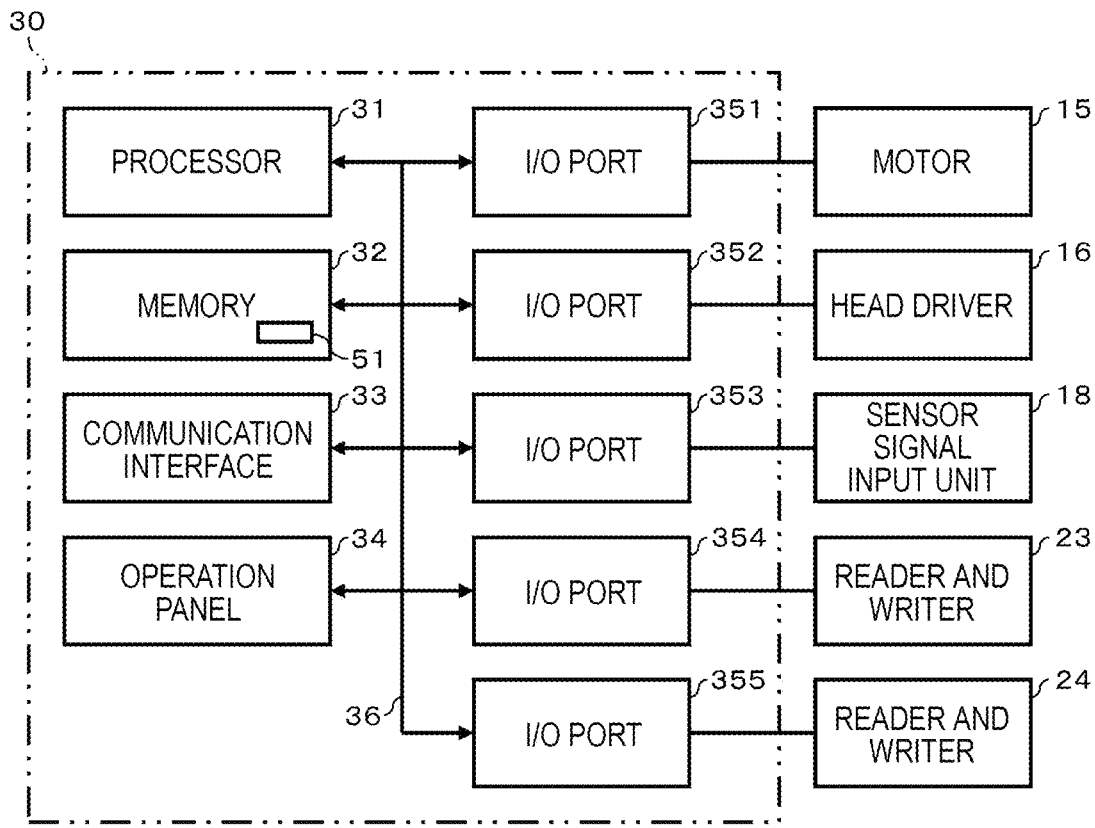

FIG. 10

| TAG ID | NUMBER OF TIMES OF COMMUNICATION n | READ F |
|--------|------------------------------------|--------|
|        |                                    |        |
|        |                                    |        |
|        |                                    |        |
| ⋮      | ⋮                                  | ⋮      |

RFID TAG COMMUNICATION DEVICE

CROSS-REFERENCE TO RELATED APPLICATIONS

This application is a continuation of U.S. patent application Ser. No. 18/185,990, filed Mar. 17, 2023, which is a continuation of U.S. patent application Ser. No. 17/314,594, filed May 7, 2021, now abandoned, which is based upon and claims the benefit of priority from Japanese Patent Application No. 2020-113942, filed Jul. 1, 2020, the entire contents of each of which are incorporated herein by reference.

FIELD

Embodiments described herein relate generally to a radio frequency identifier (RFID) tag communication device.

BACKGROUND

A system in which different items to be individually managed have an RFID tag attached to each article. Each RFID tag stores item information that is unique to the respective item within a memory of the RFID tag. RFID tags to be used in this kind of system are written with information by RFID tag communication devices. In such a RFID tag communication device, labels equipped with an RFID tag are conveyed at a predetermined interval through the RFID tag communication device for writing. The RFID tagged labels can be arranged along strips of label paper of the like. The RFID tag communication device writes the unique information to each RFID tag by wireless communication via an antenna typically placed near a middle position for the conveyance of the labels. Such RFID-tagged labels can also be printed with information corresponding to or matching the unique item information that is written to an RFID tag. A printed label including an RFID tag can then be attached to an item corresponding to that unique information. Thus, individual management and tracking of each tagged/labelled item can be realized.

In some cases, the labels have various sizes, and the RFID tag communication device is configured to write article information to RFID tags attached to the labels of various sizes. However, since the label size varies, the pitch between the RFID tags that are sequentially conveyed also varies. If the pitch is narrower, more than one RFID tag may be present in a communication area of the antenna. In such a case, the RFID tag communication device may not be able to identify the correct or intended target RFID tag to communicate for writing the corresponding unique item information and may write information to a non-targeted or unintended RFID tag in error. Hence, there is a need for an RFID tag communication device that can stably communicate with a target RFID tag for writing article information regardless of a size of a label or a pitch between RFID tags on the labels.

BRIEF DESCRIPTION OF THE DRAWINGS

FIG. 2 depicts an example of a label paper according to a first embodiment.

FIG. 3 is a block diagram of an example circuit configuration of a controller according to a first embodiment.

FIG. 4 depicts a data structure of a list table according to a first embodiment.

FIG. 10 depicts a data structure of a list table according to a second embodiment.

DETAILED DESCRIPTION

According to an embodiment, a wireless tag communication device includes a first antenna that is configured to emit radio waves towards a first region of a conveyance path for wireless tags and a second antenna that is configured to emit radio waves towards a second region of the conveyance path on a downstream side of the first region in a tag conveyance direction along the conveyance path. A shield is configured to block the radio waves emitted from the first antenna from reaching a first portion of the first region while permitting the radio waves from the first antenna to reach a second portion of the first region. A controller is configured to select a tag ID read via the first antenna from a wireless tag on the conveyance path as a target tag ID, designate the target tag ID by communication via the second antenna, and write tag information via the second antenna to the wireless tag corresponding to the designated target tag ID.

First Embodiment

Figure 1:
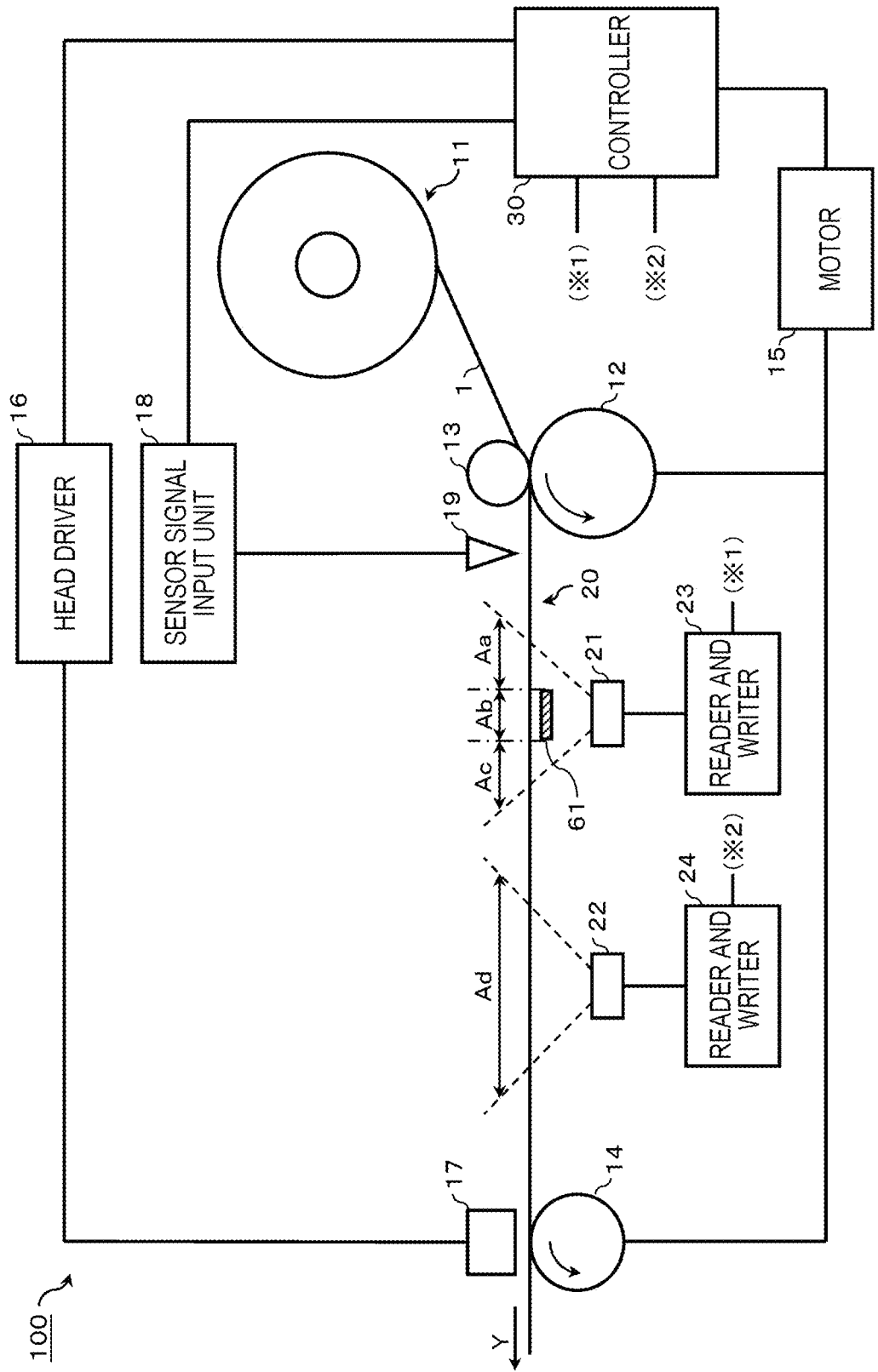
FIG. 1 depicts a schematic configuration of an RFID tag communication device according to a first embodiment.

FIG. 1 depicts a schematic configuration of an RFID tag communication device 100 according to the first embodiment.

FIG. 2 depicts an example of a label paper 1 in the present embodiment.

As shown in FIG. 2, the label paper 1 includes a strip-shaped mount 2 and a plurality of rectangle labels 3 attached to the surface of the mount 2. The labels 3 are arranged in a row at a constant interval along a longitudinal direction of the mount 2, that is a conveyance direction Y of the labels 3. In the example, each of the labels 3 has a length of La in the conveyance direction Y (that is a total length), and the respective labels 3 are arranged at an interval d therebetween. The label paper 1 has a mark 5 on a leading-edge side of each of the labels 3. The marks 5 are on the surface of the mount 2. Each mark 5 indicates a position of a leading-edge of one of the labels 3.

Each of the labels 3 includes an RFID tag 4. Each RFID tag 4 includes a storage medium and a wireless communication function. The RFID tag 4 may also be referred to as an integrated circuit (IC) tag and, in this example, is a passive tag that does not include a battery. The RFID tag 4 includes an antenna 41, an IC chip 42, and an inlay 43. The inlay 43 is used for installing (connecting) the antenna 41 and the IC chip 42 within the RFID tag 4. The IC chip 42 is an integrated circuit including a processor, a storage unit, an interface, and the like. The processor of the IC chip 42 executes programs such as operation control. The storage unit of the IC chip 42 stores programs, tag IDs, and other data executed by the processor. The tag ID is RFID tag-specific data (e.g., a unique serial number, code, or the like). The tag ID is generally written to the storage unit during the manufacturing process of the RFID tag 4. An interface of the IC chip 42 is connected to the antenna 41.

A mounting position of the RFID tag 4 on the label 3 is determined according to a type, a size, and the like of the label paper 1. In the example of FIG. 2, the RFID tag 4 is arranged on the label paper 1 at a position of a distance Lb (Lb<La) from the leading-end of the label 3 with respect to the total length La in a direction which is the same as the conveyance direction Y of the label 3. The antenna 41 of the RFID tag 4 is arranged so that the longitudinal direction of the antenna 41 is orthogonal to the conveyance direction Y. On the label paper 1, an interval between the RFID tags 4 attached to the adjacent labels 3, that is a pitch of the RFID tags 4, is constant at La+d. The pitch may vary depending on the type, size, and the like of the label paper 1.

The label paper 1 is set in the RFID tag communication device 100, for example, in a state of being wound in a rolled shape as shown in FIG. 1.

As shown in FIG. 1, the RFID tag communication device 100 includes a paper holding unit 11, a conveyance roller 12, a pinch roller 13, a platen roller 14, and a motor 15. The paper holding unit 11 holds the label paper 1 wound in a rolled shape. The conveyance roller 12 rotates in a direction of the illustrated arrow with the power of the motor 15 in a state of sandwiching the label paper 1, which has been pulled out from the paper holding unit 11, with the pinch roller 13. By this rotation, the label paper 1 sandwiched between the conveyance roller 12 and the pinch roller 13 is conveyed from the upstream side nearer to the paper holding unit 11 to the downstream side nearer to the platen roller 14 in the conveyance direction Y. The platen roller 14 rotates in the illustrated arrow direction with the power of the motor 15. By this rotation, the label paper 1 conveyed to the platen roller 14 is further conveyed to the downstream side of the platen roller 14. A label dispensing port is provided to the downstream side of the platen roller 14 where the label paper 1 is dispensed outside the RFID tag communication device 100. The conveyance roller 12, the pinch roller 13, and the platen roller 14 form a conveyance path 20 of the label paper 1. The conveyance path 20 may also be referred to as a conveyance path of the label 3 or a conveyance path of the RFID tag 4.

The RFID tag communication device 100 includes a head driver 16, a print head 17, a sensor signal input unit 18, and a label sensor 19. The head driver 16 is connected to the print head 17. The print head 17 is provided facing the platen roller 14 such that the label paper 1 can be sandwiched therebetween. The print head 17 is driven by the head driver 16 and performs printing on the label 3 conveyed to the position of the platen roller 14.

The sensor signal input unit 18 is connected to the label sensor 19. The label sensor 19 is provided near the conveyance roller 12. The label sensor 19 detects the mark 5 on the label paper 1. The label sensor 19 outputs a detection signal to the sensor signal input unit 18 when the mark 5 is detected. The sensor signal input unit 18 receives the detection signal output from the label sensor 19. The sensor signal input unit 18 outputs the received detection signal to a controller 30.

The RFID tag communication device 100 further includes a first antenna 21, a second antenna 22, a first reader and writer 23, and a second reader and writer 24. The first antenna 21 is provided on the conveyance path 20 between the conveyance roller 12 and the platen roller 14. The first antenna 21 is provided at a position where communication with the RFID tag 4 of the label 3 being conveyed along the conveyance path 20 is available.

The second antenna 22 is provided on the downstream side of the conveyance path 20 with respect to the first antenna 21. The second antenna 22 is provided at a position where communication with the RFID tag 4 of the label 3 being conveyed along the conveyance path 20 is available.

The first reader and writer 23 is connected to the first antenna 21. The first reader and writer 23 performs wireless communication with the RFID tag 4 via the first antenna 21. With this wireless communication, the first reader and writer 23 reads a tag ID from the RFID tag 4.

The second reader and writer 24 is connected to the second antenna 22. The second reader and writer 24 performs wireless communication with the RFID tag 4 via the second antenna 22. With this wireless communication, the second reader and writer 24 writes data to the RFID tag 4. This data is referred to as tag writing data herein.

The RFID tag communication device 100 further includes the controller 30. The controller 30 is connected to the motor 15, the head driver 16, the sensor signal input unit 18, the first reader and writer 23, and the second reader and writer 24.

The controller 30 controls the motor 15 to control a conveyance on and off status of the label paper 1. The controller 30 controls the motor 15 to switch or change the conveyance speed of the label paper 1 as needed. The controller 30 detects the position of the label 3 being conveyed on the conveyance path 20 according to the conveyance speed of the label paper 1 and input timing of the detection signal obtained via the sensor signal input unit 18. Then, the controller 30 controls the head driver 16 and prints data of characters, images, or the like on the printing surface of the label 3 that has been conveyed to the position of the platen roller 14. The data printed on the printing surface of the label 3 is referred to as label printing data herein. The label printing data is provided from the controller 30 to the print head 17 via the head driver 16.

According to the present embodiment, a shielding plate 61 is provided between the first antenna 21 and the conveyance path 20 of the label paper 1. The shielding plate 61 is provided closer to the conveyance path 20 between the first antenna 21 and the conveyance path 20. The shielding plate 61 is, for example, a rectangle metal plate. The shielding plate 61 is disposed so that its long side and short side are substantially parallel to the width direction and the conveyance direction Y of the label paper 1, respectively. The length of the long side is at least longer than the length of the inlay 43 in the longitudinal direction in the RFID tag 4. The length of the short side is at least longer than the length of the inlay 43 in the short direction.

The shielding plate 61 shields a portion of an area where the communication between the first antenna 21 and the RFID tag 4 being conveyed along the conveyance path 20 is available. Such an area is referred to as a communication available area, and the shielded portion of the communication available area forms a communication unavailable area. For example, as shown in FIG. 1, the shielding plate 61 is at a position where the communication unavailable area Ab is formed between the communication available areas Aa and Ac along the conveyance path 20. In the RFID tag 4 that passes through the communication unavailable area Ab, a received signal strength indicator (RSSI) of a radio wave radiated from the first antenna 21 decreases.

A shielding plate is not provided for, or in conjunction with, the second antenna 22. Therefore, in a communication available area Ad of the second antenna 22, there is no communication unavailable area.

FIG. 3 is a block diagram of an example circuit configuration of the controller 30. The controller 30 includes a processor 31, a memory 32, a communication interface 33, an operation panel 34, and first to fifth I/O ports 351 to 355. The controller 30 connects the processor 31, the memory 32, the communication interface 33, the operation panel 34, and the I/O ports 351 to 355 to a system bus 36. The system bus 36 includes an address bus, a data bus, and the like.

The processor 31 corresponds to a central portion of the controller 30. The processor 31 controls each unit so that various functions as the RFID tag communication device 100 are to be realized according to an operating system or an application program. The processor 31 is, for example, a central processing unit (CPU).

The memory 32 corresponds to a storage portion of the controller 30. The memory 32 includes a nonvolatile memory area and a volatile memory area. The memory 32 stores an operating system or an application program in a nonvolatile memory area. The memory 32 stores data required for the processor 31 to execute processes for controlling each portion in a volatile memory area. The memory 32 uses the volatile memory area as a work area where the data is appropriately rewritten by the processor 31. The nonvolatile memory area is, for example, a read only memory (ROM). The volatile memory area is, for example, a random-access memory (RAM).

The communication interface 33 is for communication with an external device (or an upper level device). For example, the communication interface 33 is used for receiving the label printing data and the tag writing data from the external device.

The operation panel 34 includes an interface function to be operated by a user or an operator. The operation panel 34 includes, for example, a display device equipped with a touch panel. Using the display device, a start instruction of a label dispensing process or the like is inputted to the operation panel 34 by a user or an operator.

The first to fifth I/O ports 351 to 355 are circuits for sending and receiving data signal between the processor 31 and devices connected to the I/O ports 351 to 355. For example, the motor 15 is connected to the first I/O port 351. The processor 31 outputs a drive-on signal, a drive-off signal, and the like to the motor 15 via the first I/O port 351. The head driver 16 is connected to the second I/O port 352. The processor 31 outputs the label printing data and the like to the head driver 16 via the second I/O port 352. The sensor signal input unit 18 is connected to the third I/O port 353. The processor 31 receives the detection signal from the sensor signal input unit 18 via the third I/O port 353. The first reader and writer 23 is connected to the fourth I/O port 354. The processor 31 inputs data such as a tag ID read by the first reader and writer 23 via the fourth I/O port 354. The second reader and writer 24 is connected to the fifth I/O port 355. The processor 31 outputs the tag writing data and the like to the second reader and writer 24 via the fifth I/O port 355.

The controller 30 has a list table 51 stored in the memory 32. FIG. 4 depicts an example data structure of the list table 51. The list table 51 includes areas for describing tag IDs, the numbers of times of communication failure n, and process completion flags F.

Figure 5:
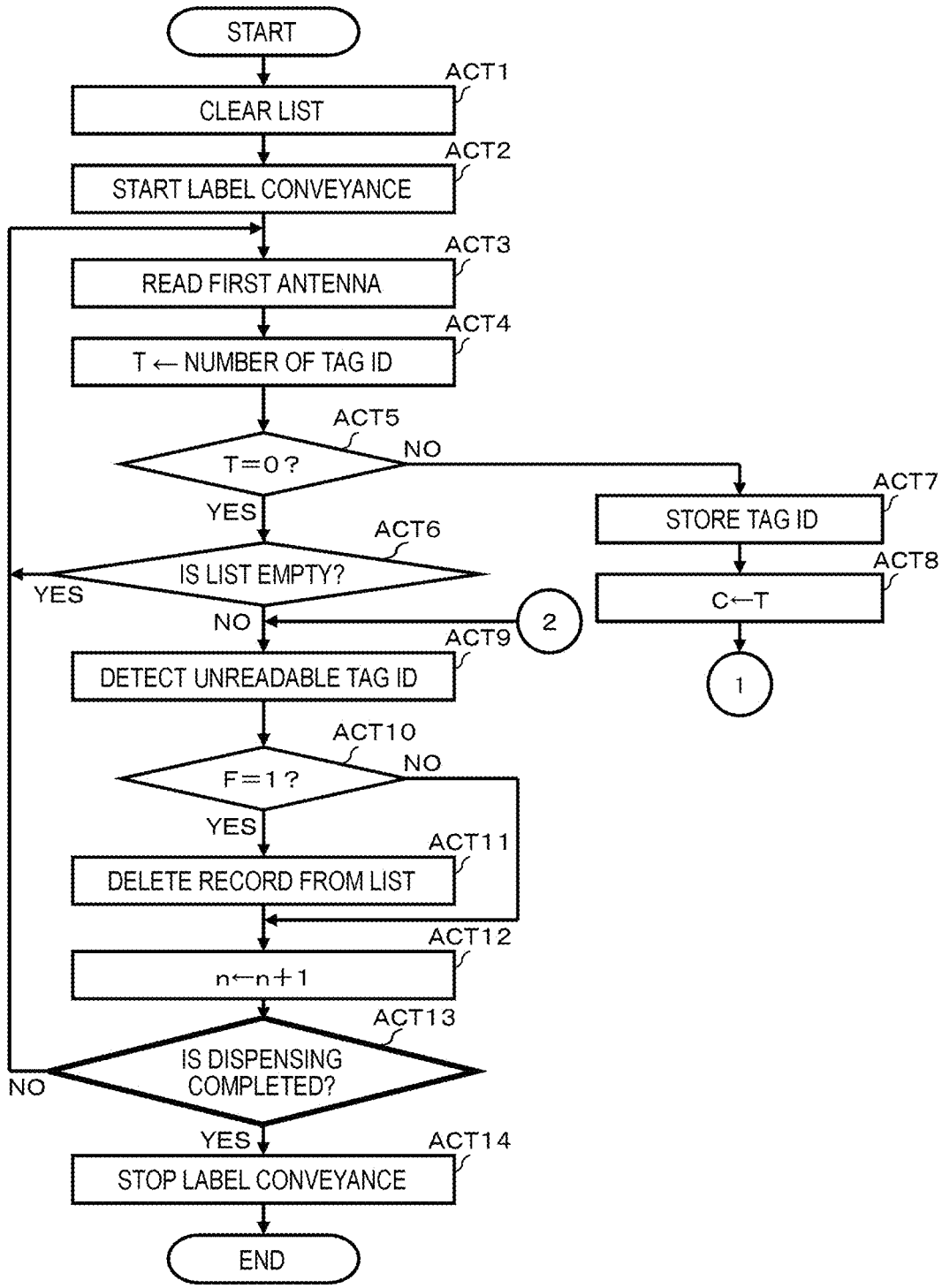
FIG. 5 is a flowchart of a label dispensing process according to a first embodiment.
Figure 6:
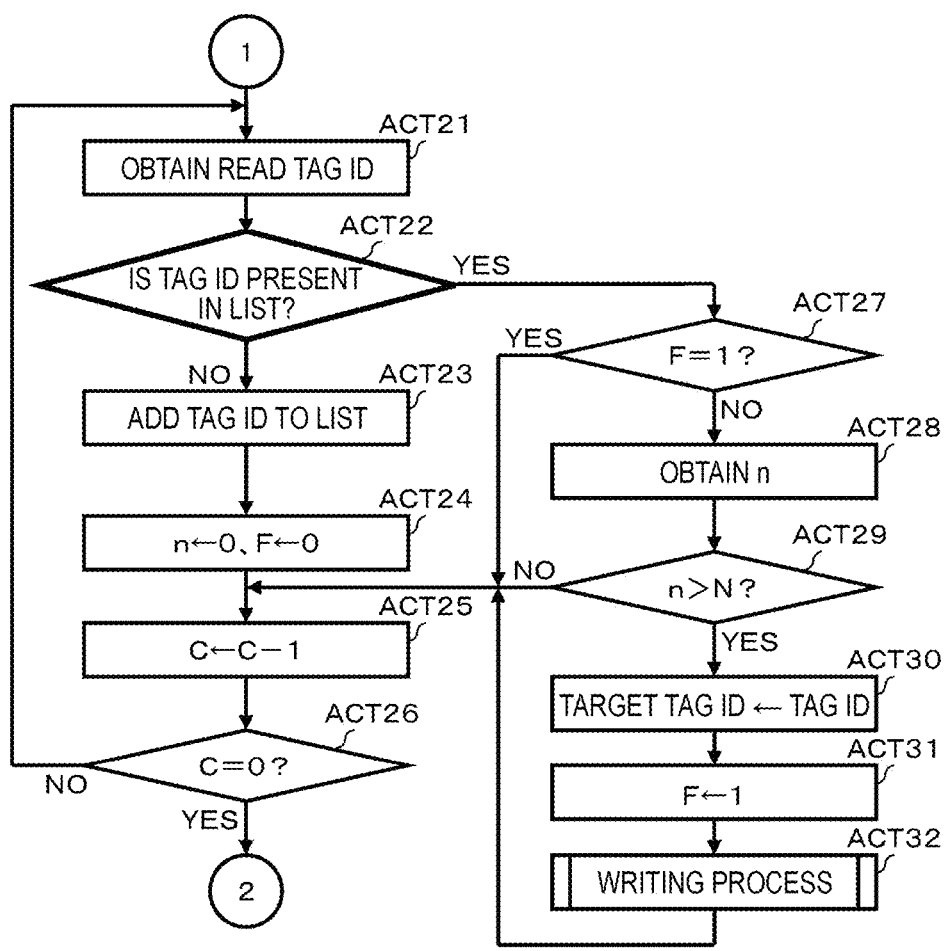
FIG. 6 is a flowchart of a label dispensing process according to a first embodiment.
Figure 7:
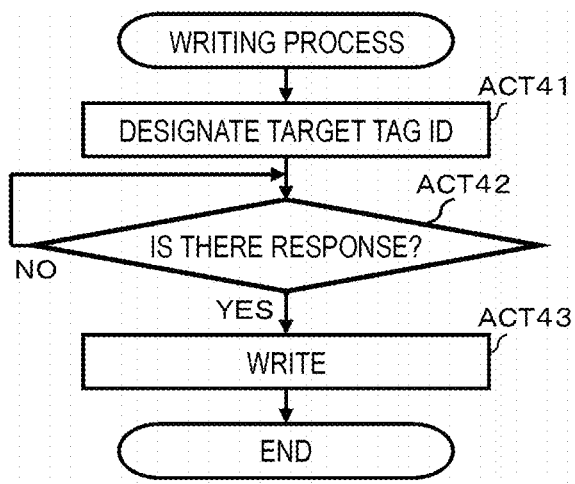
FIG. 7 is a flowchart of a writing process according to a first embodiment.

FIGS. 5 and 6 are flowcharts of the label dispensing process that is executed by the processor 31 according to a control program. FIG. 7 is a flowchart of a writing process executed as a subroutine of the label dispensing process. These processes according to the present embodiment are examples and are not limited thereto so long as the same or substantially the same results can be obtained.

As an initial step, the RFID tag communication device 100 receives the tag writing data and the label printing data of the labels 3 for a predetermined number of label sheets from the external device and stores the data in the memory 32. In this state, if the start instruction of the label dispensing process is received via the operation panel 34 (see FIG. 3), the processor 31 starts the label dispensing process as shown in the flowchart of FIG. 5.

In Act 1 of the flowchart, the processor 31 clears the list table 51. In Act 2, the processor 31 activates the motor 15 to convey the label paper 1 along the conveyance path 20.

Subsequently, in Act 3, the processor 31 controls the first reader and writer 23 so that the tag ID is read from the RFID tag 4 by the wireless communication with the first antenna 21. According to the control, the radio wave including a tag ID reading command is radiated from the first antenna 21. If the RFID tag 4 receives the radio wave, a response wave is sent back (returned) from the RFID tag 4, and the first reader and writer 23 reads the tag ID from the response wave received via the first antenna 21. The tag ID read by the first reader and writer 23 is given to the processor 31. In Act 4, the processor 31 calculates the number of tag IDs read by the first reader and writer 23, that is, a number of read tag IDs T.

The processor 31 determines whether the number of read tag IDs T is "0" in Act 5. If the number of read tag IDs T is "0," that is, no tag ID has been read by the first reader and writer 23 (YES in ACT 5), the processor 31 proceeds to Act 6 and determines whether the list table 51 is empty.

If the processor 31 determines that no data has been written to the list table 51 and that the list table 51 is empty (YES in Act 6), the processor 31 returns to Act 3. The processor 31 controls the first reader and writer 23 again to read the tag ID from the RFID tag 4 in Act 3.

In this manner, the processor 31 controls the first reader and writer 23 to repeat the wireless communication via the first antenna 21 until the tag ID of the RFID tag 4 is read. Then, if at least one tag ID is read (NO in Act 5), the processor 31 proceeds to Act 7. In Act 7, the processor 31 stores the read tag ID in the tag ID area of the memory 32. In Act 8, the processor 31 sets the number of read tag IDs T as an initial value of a subtraction counter C. The subtraction counter C is formed, for example, in the memory 32. Thereafter, the processor 31 proceeds to Act 21 of FIG. 6.

In Act 21, the processor 31 obtains an unprocessed tag ID among the tag IDs stored in the tag ID area of the memory 32. The obtained unprocessed tag ID is referred to as an unprocessed tag ID in this context. In Act 22, the processor 31 determines whether an unprocessed tag ID is present in the list table 51. If an unprocessed tag ID is not present in the list table 51 (NO in Act 22), the processor 31 proceeds to Act 23 and adds the unprocessed tag ID to the list table 51. The processor 31 then sets values for the number of communication failures n and the process completion flag F correlated with the unprocessed tag ID to "0" in Act 24.

The processor 31 reduces (decrements) the subtraction counter C by "1" in Act 25. Then, the processor 31 checks whether the subtraction counter C is "0" in Act 26. If the subtraction counter C is "1" or more (NO in Act 26), it means that there is another unprocessed tag ID still in the list table 51, and the processor 31 returns to Act 21 and repeats the processes until subtraction counter C is 0 (YES in ACT 26).

Referring back to Act 22, if the unprocessed tag ID is present in the list table 51 (YES in Act 22), the processor 31 proceeds to Act 27. The processor 31 determines whether the process completion flag F correlated with the unprocessed tag ID is set to "1" in Act 27.

If the process completion flag F is not set to "1" (NO in Act 27), the processor 31 proceeds to Act 28 and obtains the number of communication failures n correlated with the unprocessed tag ID. In Act 29, the processor 31 checks whether the number of communication failures n exceeds a predetermined number N. The predetermined number N is a value approximately equal to the number of reading attempts of a tag ID which can be assumed to be experience when normally conveyed together with the label paper 1 along the conveyance path 20 to pass through the communication unavailable area Ab of the first antenna 21.

If the number of communication failures n does not exceed the predetermined number N (NO in Act 29), the processor 31 proceeds to Act 25 and repeats the processes.

If the number of communication failures n exceeds the predetermined number N (YES in Act 29), the processor 31 proceeds to Act 30. In Act 30, the processor 31 designates the unprocessed tag ID as a target tag ID and writes the target tag ID to the target tag area of the memory 32. Then, the processor 31 sets the process completion flag F correlated with the unprocessed tag ID (that is the target tag ID) of the list table 51 to "1" in Act 31. Thereafter, the processor 31 activates the writing process in Act 32.

The processor 31 that has activated the writing process proceeds to Act 25 and repeats the processes.

Referring back to ACT 27, if the process completion flag F correlated with the unprocessed tag ID present in the list table 51 is set in advance (YES in ACT 27), the processor 31 directly proceeds to Act 25 and repeats the processes.

If the subtraction counter C becomes "0" as a result of executing the process of Act 25 (YES in Act 26), the processor 31 proceeds to Act 9 of FIG. 5. Also, as shown in FIG. 5, in a case where no tag ID has been read with the first antenna 21, that is T=0 (YES in ACT 5) and some data are present in the list table 51, that is the list table 51 is not empty (No in Act 6), the processor 31 proceeds to Act 9.

In Act 9, the processor 31 detects a tag ID that had not been read in the reading process of Act 3 among the tag IDs described in the list table 51. This tag ID is referred to as an unreadable tag ID herein. In Act 10, the processor 31 determines whether an unreadable tag ID of which process completion flag had been set to "1" is present in the list table 51. If there is an unreadable tag ID with the process completion flag set to "1" in the list table 51 (YES in Act 10), the processor 31 proceeds to Act 11 and deletes a record of that unreadable tag ID from the list table 51. Thereafter, the processor 31 proceeds to Act 12.

If the unreadable tag ID of the process completion flag "1" is not in the list table 51 (NO in Act 10), the processor 31 skips the process of Act 11 and proceeds to Act 12.

In Act 12, the processor 31 adds "1" to the number of communication failures n corresponding to the unread tag ID among the tag IDs in the list table 51. In Act 13, the processor 31 checks whether the label dispensing process has been completed. The label dispensing process is for writing the tag writing data received from the external device to the RFID tags 4 and dispensing a predetermined number of labels 3 for which the label printing data has been printed on the printing surfaces of the labels 3.

If the label dispensing process has not yet been completed (NO in Act 13), the processor 31 returns to Act 3 and repeats the processes.

Once the label dispensing process is complete (YES in ACT 13), the processor 31 proceeds to Act 14 and stops the motor 15 to stop the conveyance of the label paper 1.

FIG. 7 is a flowchart of the writing process according to the first embodiment. In Act 41, the processor 31 controls the second reader and writer 24 to transmit the radio wave for designating the target tag ID to the RFID tag 4. Based on this control, the radio wave including the target tag ID and a command that designates the target tag ID is radiated from the second antenna 22. If the RFID tag 4 that stores the designated target tag ID in the IC chip 42 receives this radio wave, a response wave will be returned from the RFID tag 4. The response wave will then be received by the second antenna 22 and output to the processor 31 as the response signal via the second reader and writer 24.

In Act 42, the processor 31 waits for the response signal from the RFID tag 4. Once the response signal has been received via the second antenna 22 and the second reader and writer 24 (YES in Act 42), the processor 31 proceeds to Act 43 and controls the second reader and writer 24 to write the tag writing data to the RFID tag 4. Based on this control, a radio wave including the tag writing data and the tag writing command is radiated from the second antenna 22. This radio wave is received by the RFID tag 4 that stores the designated target tag ID by the IC chip 42, and the tag writing data is written to the IC chip 42 (Act 43). Whenever the writing process is activated in Act 32 (see FIG. 6), the processor 31 executes these steps as shown in FIG. 7.

The label 3 which has the tag writing data written to the RFID tag 4 is further conveyed to the downstream of the conveyance path 20. When the label 3 reaches the position of the platen roller 14, the print head 17 operated by the head driver 16 prints the label printing data to the printing surface of the label 3. In this manner, the tag writing data is written to the RFID tag 4, and the label 3 with the label printing data printed on the printing surface is dispensed from the label dispensing port to the outside of the RFID tag communication device 100.

Once the predetermined number of sheets of the labels 3, with the tag writing data and the label printing data received from the external device recorded thereon, has been dispensed from the label dispensing port, the RFID tag communication device 100 ends the label dispensing process.

After the end of the label dispensing process, the controller 30 rotates the motor 15 in a reverse direction and conveys the label paper 1 in the opposite direction such that the label 3 at the leading position among the labels 3 remaining on the conveyance path 20 returns to the upstream side with respect to the label sensor 19. Thereafter, the processor 31 may stop the conveyance of the label paper 1. The reverse rotation control of the motor 15 may be performed by the processor 31 before the process of Act 2 starts.

In the present embodiment, the RFID tag communication device 100 includes the first antenna 21 and the second antenna 22 along the conveyance path 20 where the RFID tags 4 are conveyed together with the plurality of labels 3 attached to the label paper 1. The second antenna 22 is provided on the downstream side with respect to the first antenna 21 in the conveyance direction Y of the conveyance path 20. The shielding plate 61 that blocks the radio wave emitted from the first antenna 21 to the RFID tag 4 is disposed so that at least a portion (such as a middle portion as shown in FIG. 1) between the communication available areas Aa and Ac where the first antenna 21 can perform the communication with the RFID tag 4 becomes the communication unavailable area Ab, that is the area where the first antenna 21 cannot perform the wireless communication with the RFID tag 4.

In the present embodiment, the controller 30 identifies one of the tag IDs read from the plurality of RFID tags 4 by the communication via the first antenna 21. For example, the controller 30 identifies a single tag ID that has passed through the communication unavailable area Ab and thus has become temporarily unreadable via the first antenna 21, that is a single tag ID of which the number of communication failures n has exceeded the predetermined number N, among the tag IDs read from the RFID tags 4 by the communication via the first antenna 21. If the single tag ID is identified, the controller 30 designates that tag ID by the communication via the second antenna 22. Then, the controller 30 writes the tag writing data to a single RFID tag 4 of the identified single tag ID, among the plurality of RFID tags 4, that is now connected to the communication via the second antenna 22 by the designation of that specific tag ID. In this manner, the RFID tag communication device 100 designates a tag ID that has been previously identified by communication via the first antenna 21 using communication via the second antenna. The RFID tag communication device 100 writes the tag writing data to one RFID tag 4 according to the designation of the tag ID. Accordingly, the RFID tag communication device 100 can correctly identify one RFID tag 4 among the various RFID tags 4 as the particular target RFID tag 4 for communication and thus more stably communicate with the target RFID tag 4 for the writing of the tag writing data.

Furthermore, the RFID tag communication device 100 identifies a RFID tag 4 that is assumed to have passed through the communication unavailable area Ab using the first antenna 21. Accordingly, the pitch of the RFID tags 4 conveyed together with the labels 3 on the label paper 1 does not necessarily relate to the designation of the RFID tag 4. Therefore, regardless of the tag pitch on the label paper 1 or the mount 2 of the label paper 1 (see FIG. 2), the RFID tag communication device 100 can correctly identify and stably communicate with the particular target RFID tag 4.

In the present embodiment, the RFID tag communication device 100 designates the previously identified tag ID by wireless communication via the second antenna 22 and the second reader and writer 24. Then, the RFID tag communication device 100 writes tag writing data to the RFID tag 4, which has responded to the wireless communication via the second antenna 22 designating the identified tag ID. Accordingly, even if a plurality of RFID tags 4 are present in the communication available area Ad of the second antenna 22, the tag writing data can still be stably written to the particular target RFID tag 4. Thus, the radio wave intensity of the second antenna 22 can be increased, and a more stable tag writing operation can be realized.

Second Embodiment

Figure 8:
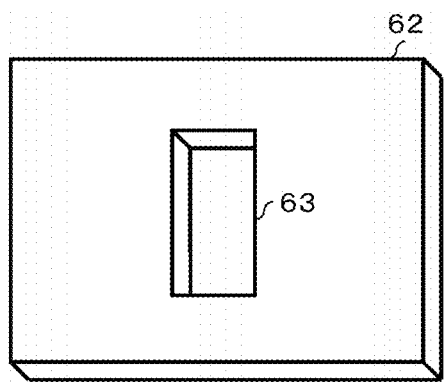
FIG. 8 depicts a shielding plate according to a second embodiment.

In the first embodiment, the shielding plate 61 is a rectangle metal plate. The shape of the shielding plate 61 is not limited thereto. FIG. 8 is a schematic diagram of a shielding plate 62 according to a second embodiment. The shielding plate 62 includes a rectangular opening 63 formed in a central portion of a rectangular plate. The plate may be made of, for example, metal.

Figure 9:
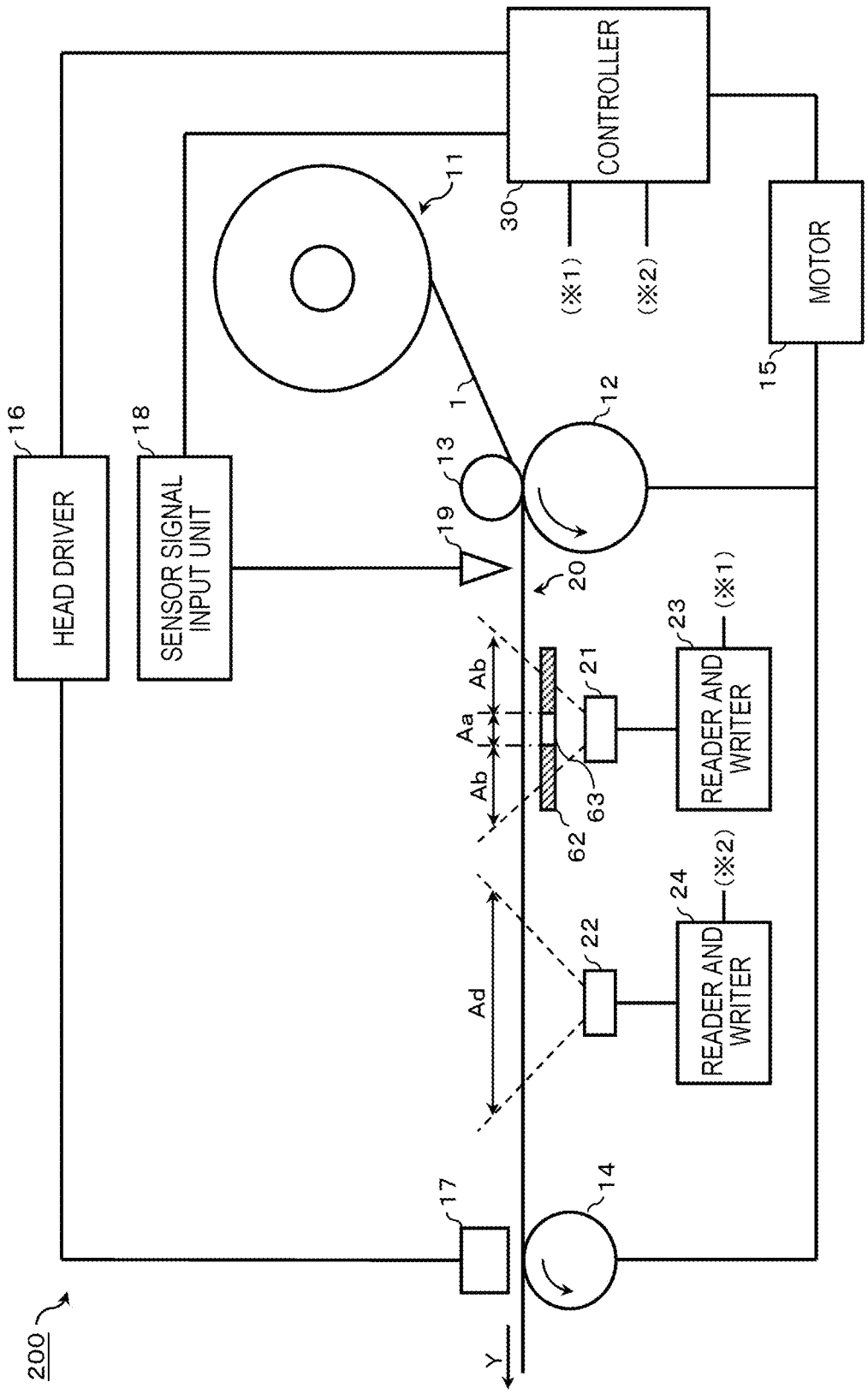
FIG. 9 depicts a schematic configuration of an RFID tag communication device according to a second embodiment.

FIG. 9 depicts a schematic configuration of an RFID tag communication device 200 according to the second embodiment. Portions common to the RFID tag communication device 100 of the first embodiment are designated with the same reference numerals, and additional descriptions thereof may be omitted. The RFID tag communication device 200 includes the shielding plate 62 between the first antenna 21 and the conveyance path 20 of the label paper 1. The shielding plate 62 is closer to the conveyance path 20 between the first antenna 21 and the conveyance path 20. The opening 63 of the shielding plate 62 is positioned above the center of a radiation surface of the first antenna 21, and the longitudinal direction of the opening 63 is identical to the width direction of the label paper 1 being conveyed along the conveyance path 20.

The shielding plate 62 shields a portion of a communication available area where the first antenna 21 can communicate with the RFID tag 4 being conveyed along the conveyance path 20 to form both the communication unavailable area Ab and the communication available area Aa on the conveyance path 20 as shown in FIG. 9. The communication available area Aa is formed by the opening 63 of the shielding plate 62 above the center of the radiation surface of the first antenna 21. The shape and size of the communication available area Aa is limited by the shape and size of the opening 63. The shielding plate 62 blocks the radio waves emitted from the first antenna 21 and creates the communication unavailable area Ab by allowing only part of the emitted radio waves to reach the conveyance path 20 via the limited communication available area Aa. By providing the shielding plate 62 in this manner, the first reader and writer 23 can read, via the first antenna 21, the tag IDs from the RFID tags 4 that pass through the limited communication available area Aa. The first reader and writer 23 cannot read the tag IDs from the RFID tags 4 that are passing through the communication unavailable area Ab since the radio waves from the first antenna 21 are blocked from this area.

FIG. 10 depicts an example data structure of a list table 52 formed in the memory 32 of the RFID tag communication device 200 according to the second embodiment. The list table 52 includes areas for tag IDs, the numbers of communication attempts n, and read flags F.

Figure 11:
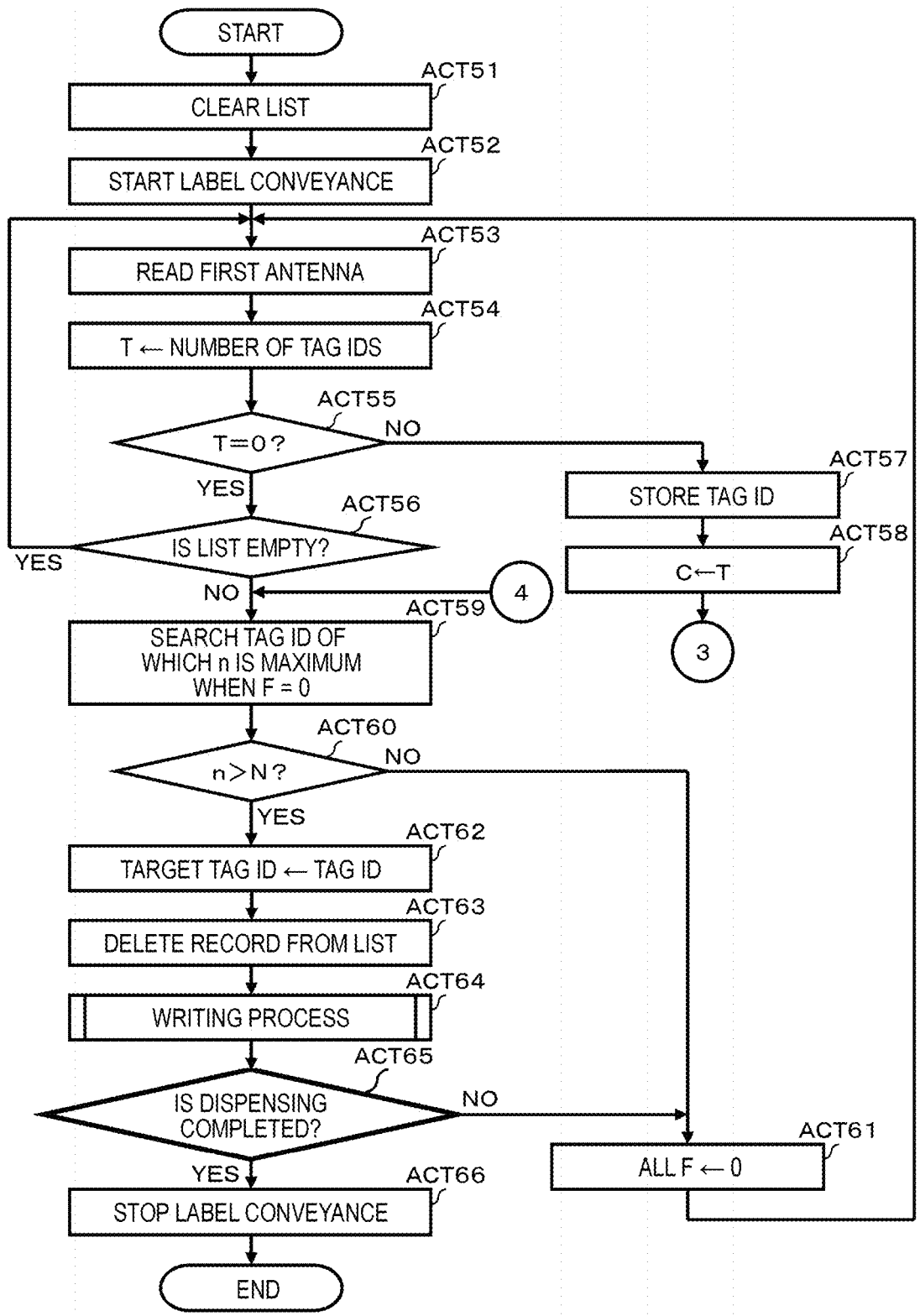
FIG. 11 is a flowchart of a label dispensing process according to a second embodiment.
Figure 12:
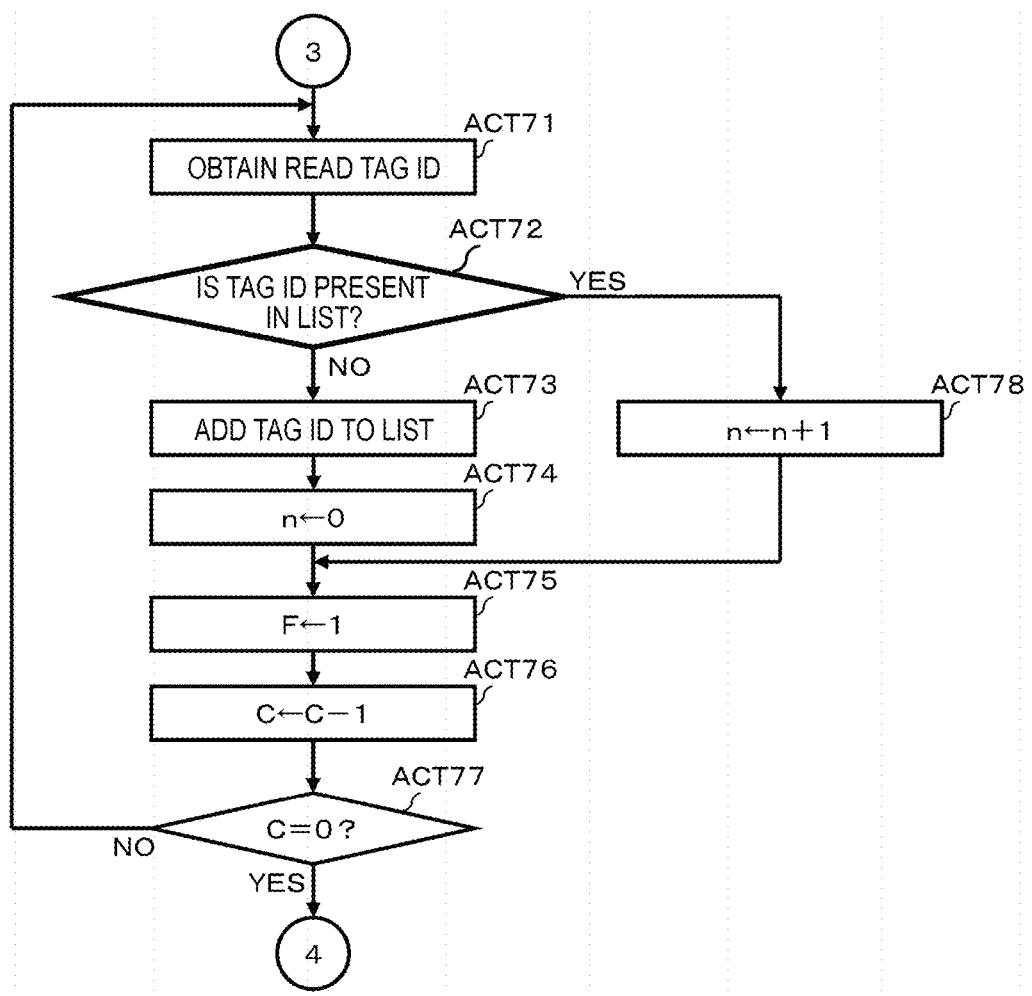
FIG. 12 is a flowchart of a label dispensing process according to a second embodiment.

FIGS. 11 and 12 are flowcharts of a label dispensing process that is executed by the processor 31 of the RFID tag communication device 200 according to the control program. These processes according to the present embodiment are examples and are not limited thereto so long as the same or substantially the same results can be obtained.

As an initial step, the RFID tag communication device 200 receives the tag writing data and the label printing data for a predetermined number of labels 3 from an external device and stores the data in the memory 32. In this state, if a start instruction of the label dispensing process is received via the operation panel 34 (see FIG. 3), the processor 31 starts the label dispensing process as shown in the flowchart of FIG. 11.

The processes of Acts 51 to 58 executed by the processor 31 are the same as those of Acts 1 to 8 of FIG. 5 executed by the same processor 31. Therefore, the descriptions thereof are not repeated.

In Act 58, once the processor 31 sets the number of read tag IDs T as an initial value of the subtraction counter C, the processor 31 proceeds to Act 71 of FIG. 12. In Act 71, the processor 31 obtains an unprocessed tag ID from the tag IDs stored in a tag ID area of the memory 32 (see FIG. 3). In Act 72, the processor 31 determines whether the obtained unprocessed tag ID is present in the list table 52. If the unprocessed tag ID is not present in the list table 52 (NO in Act 72), the processor 31 proceeds to Act 73 and adds the unprocessed tag ID to the list table 52. The processor 31 then sets the number of communication attempts n correlated with the unprocessed tag ID to "O" in Act 74. Further, the processor 31 sets the read flag F correlated with the unprocessed tag ID to "1" in Act 75.

The processor 31 subtracts "1" from the subtraction counter C in Act 76. Then, the processor 31 confirms checks whether the subtraction counter C equals "O" in Act 77. If the subtraction counter C is "1" or more (NO in Act 77), it means that there is another unprocessed tag ID present in the list table 52, and the processor 31 returns to Act 71 and repeats the processes.

Referring back to Act 72, if an unprocessed tag ID is present in the list table 52 (YES in Act 72), the processor 31 proceeds to Act 78 and adds "1" to the number of communication attempts n correlated with the unprocessed tag ID. Thereafter, the processor 31 proceeds to Act 75 and executes the processes of Acts 75 to 77.

If the subtraction counter C becomes "0" as a result of executing the process of Act 77 (YES in Act 77), the processor 31 proceeds to Act 59 of FIG. 11. Also, as shown in FIG. 11, in a case where no tag ID has been read by the first antenna 21, that is T=0 (YES in ACT 5) and some data are present in the list table 52, that is the list table 52 is not empty (NO in Act 56), the processor 31 proceeds to Act 59.

In Act 59, the processor 31 searches the list table 52 to find, among the saved tag IDs, a tag ID for which the read flag F is "0" and the number of communication attempts n the highest. In Act 60, the processor 31 determines whether the number of communication attempts n of the searched tag ID exceeds the predetermined number N. The predetermined number N is a value approximately equal to the number of reading attempts which can be assumed to be made while an RFID tag 4 is normally conveyed together with the label paper 1 along the conveyance path 20 to pass through the communication available area Aa of the first antenna 21.

If the number of communication attempts n of the tag ID does not exceed the predetermined number N (NO in Act 60), the processor 31 proceeds to Act 61. The processor 31 rewrites all the read flags F described in the list table 52 to "0" in Act 61. Thereafter, the processor 31 returns to Act 53 and repeats the processes.

If the number of communication attempts n of the tag ID exceeds the predetermined number N (YES in Act 60), the processor 31 proceeds to Act 62 and identifies an unprocessed tag ID as the target tag ID and writes the target tag ID to the target tag area of the memory 32. Then, in Act 63, the processor 31 deletes the record of the identified target tag ID from the list table 52. Thereafter, the processor 31 activates the writing process in Act 64 in the same manner as that in the first embodiment (see FIGS. 6 and 7).

After the writing process is executed and the label 3 is dispensed, the processor 31 determines whether the label dispensing process has been completed (Act 65). If the label dispensing process has not yet been completed (NO in Act 65), the processor 31 proceeds to Act 61 and rewrites all the read flags F described in the list table 52 to "0" and returns to the process of Act 53 to repeat the processes.

Once the label dispensing process is complete (YES in Act 65), the processor 31 proceeds to Act 66 and stops the motor 15 to stop the conveyance of the label paper 1.

In the RFID tag communication device 200 according to the second embodiment, the first antenna 21 and the second antenna 22 are provided in that order from the upstream side of the conveyance direction Y along the conveyance path 20. Then, the shielding plate (or the shielding portion) 62 is provided so that the radio wave emitted from the first antenna 21 is blocked in the communication unavailable area Ab formed on the conveyance path 20 while the part of the communication available area Aa (or the limited communication available area Aa) is left on the conveyance path 20 by, for example, the opening 63 of the shielding plate 62 (see FIG. 8). Then, the controller 30 identifies the tag ID read from the RFID tag 4 that passes through the limited communication available area Aa by the communication via the first antenna 21. For example, the controller 30 identifies the tag IDs for which the number of reading attempts n via the first antenna 21 exceeds the predetermined number N. If such a tag ID has been identified, the controller 30 designates the tag ID by communication via the second antenna 22. The controller 30 writes the tag writing data to this RFID tag 4 by the designation of the tag ID.

Also, the RFID tag communication device 200 of the second embodiment can achieve the same or substantially the same effects as those in the RFID tag communication device 100 of the first embodiment. Additionally, in the second embodiment, since the limited communication available area Aa can be made narrower by the shielding plate 62 such that only one single tag ID is read by the first antenna 21, compared with the first embodiment in which a plurality of tag IDs might be read by the first antenna 21, there is an advantage of reducing the process load of the processor 31 of the RFID tag communication device 200. In the first embodiment, there can be an advantage in that the structure of the shielding plate 61 may be simpler and smaller than the shielding plate 62 of the RFID tag communication device 200.

Third Embodiment

Figure 13:
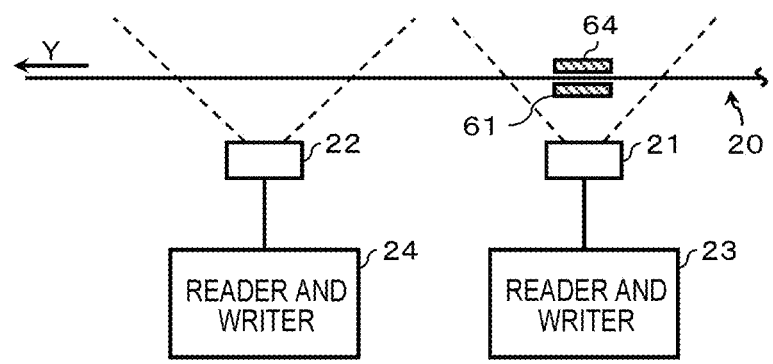
FIG. 13 depicts a part of a RFID tag communication device according to a third embodiment.

FIG. 13 depicts a part of a RFID tag communication device according to a third embodiment. Portions common to the first embodiment are designated with the same reference numerals, and the descriptions thereof are not repeated. A difference in configuration of the third embodiment from the first embodiment is that a second shielding plate 64 is provided facing the shielding plate 61 with the conveyance path 20 sandwiched therebetween. In this manner, by sandwiching the conveyance path 20 between the shielding plate 61 and the second shielding plate 64, a radio wave that may circumvent the shielding plate 61 and reach the RFID tag 4 on the conveyance path 20 can be effectively shielded. Therefore, the radio wave from the first antenna 21 to the RFID tag 4 can be shielded more securely than in the case of the first embodiment. Accordingly, the reliability of the RFID tag communication device 100 can be further improved.

Fourth Embodiment

Figure 14:
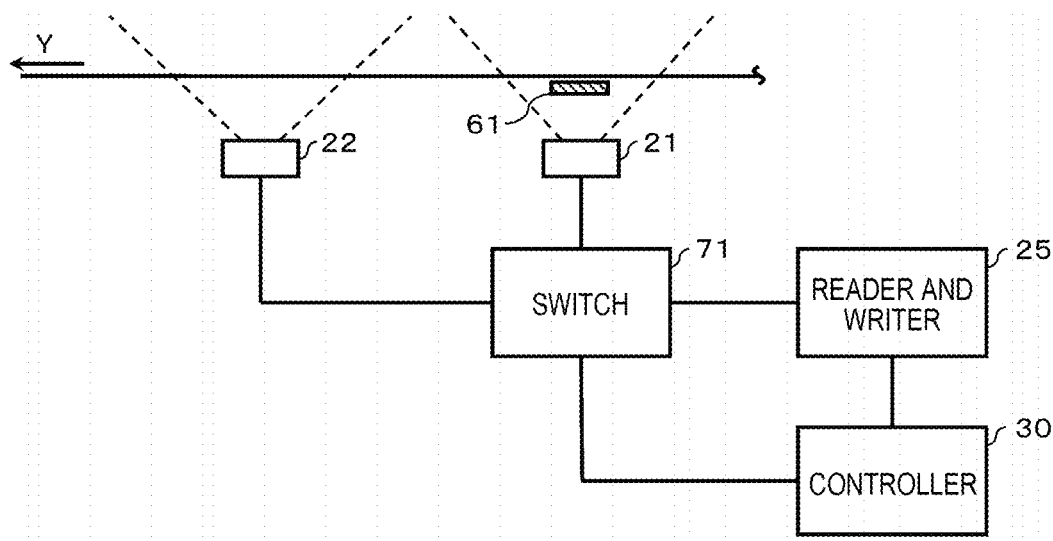
FIG. 14 depicts a part of a RFID tag communication device according to a fourth embodiment.

FIG. 14 depicts a part of a RFID tag communication device according to a fourth embodiment. Portions common to the first embodiment are designated with the same reference numerals, and the descriptions thereof are omitted. A difference in configuration of the fourth embodiment from the first embodiment is that the first reader and writer 23 and the second reader and writer 24 are combined to a third reader and writer 25. A switch 71 is also provided to a line that connects the third reader and writer 25 with the first antenna 21 and the second antenna 22. The switch 71 is controlled by the controller 30. For example, the controller 30 controls the switch 71 to connect the first antenna 21 to the third reader and writer 25 during the processes from Act 1 to Act 31 in FIGS. 5 and 6. Then, when the controller 30 starts the process of Act 32, the controller 30 controls the switch 71 to connect the second antenna 22 to the third reader and writer 25. When the writing of the tag writing data ends, the controller 30 controls the switch 71 to connect the first antenna 21 back to the third reader and writer 25.

A switch control unit that controls the switch 71 may be included in or may not be included in the controller 30. In the latter case, the third reader and writer 25 may include the switch control unit so as to control the switch 71 based on a command received from the controller 30.

The fourth embodiment can achieve the same or substantially the same effects as those of the other present embodiments. In addition, according to the fourth embodiment, the reader and writers can be combined into one, and thus there is an advantage of reducing the cost. There is also an advantage of reducing the installation space of the reader and writers.

The embodiments are not limited to the first to fourth embodiments.

The first to fourth embodiments generally relate to whether the tag ID of the RFID tag 4 can be read or not by the wireless communication via the first and second antennas 21 and 22. Regarding this point, in a modified embodiment, even if the controller 30 were able to read the tag ID by the wireless communication, the controller 30 might regard that the tag ID had not been read and execute processes accordingly, in a case where the radio wave reception intensity is equal to or lower than a predetermined threshold.

In the present embodiments, the communication available area Ad of the second antenna 22 does not overlap with the communication available areas Aa and Ac of the first antenna 21. In a modified embodiment, the second antenna 22 may be arranged closer to the first antenna 21 so that the communication available area Ad of the second antenna 22 overlaps with the communication available area Aa or Ac of the first antenna 21. In such a case, the distance of the conveyance path 20 from the conveyance roller 12 to the platen roller 14 can be reduced, and the RFID tag communication devices 100 and 200 can be further miniaturized.

According to the first embodiment, the unit of the predetermined number N to be compared with the number of communication failures n may be changed to time (e.g., rather than counting individual reading attempts a length of time during which or for which communication has been attempted may be tracked). In the same manner, according to the second embodiment, the unit of the predetermined number N to be compared with the number of communication attempts n may be changed to time. That is, in the first embodiment, the tag ID for which the elapsed time of communication unavailable state exceeds a the predetermined time N may be identified. In the same manner, in the second embodiment, a tag ID for which the elapsed time of the communication available state exceeds a predetermined time N may be identified.

While in the present embodiments, the RFID tag 4 to be conveyed along the conveyance path 20 is provided on the label 3, in some cases, the RFID tag 4 may not be necessarily provided on the label 3. For example, the RFID tag 4 can be provided on a sheet-shaped paper or the like which is sequentially conveyed. In such a case, the first antenna 21 and the second antenna 22 are arranged along the conveyance path 20 so that the same or substantially the same effects are achieved as those in the present embodiments. Alternatively, the RFID tag can be independently conveyed on the conveyance path 20 where the first antenna 21 and the second antenna 22 are arranged to obtain the same or substantially the same effects as those in the present embodiments.

The process to be executed by the controller 30 via the second antenna 22 is not limited to the writing process of the tag writing data. For example, a process of reading data pre-stored in the RFID tag 4 other than the tag ID or a process of updating the data that has been read from the RFID tag 4 and rewriting it to the RFID tag 4 is applicable.

The material of the shielding plates 61 and 62 is not limited to metal. Any material that can shield radio waves emitted from the first antenna 21 in order to form the area where the communication between the first antenna 21 and the RFID tag 4 on the conveyance path 20 is not established, such as the communication unavailable area Ab, can be used.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag communication device, comprising:
a first antenna configured to emit radio waves towards a first region of a conveyance path for wireless tags, the first region being where the first antenna can communicate with the wireless tags being conveyed along the conveyance path;
a second antenna configured to emit radio waves towards a second region of the conveyance path on a downstream side of the first region in a tag conveyance direction along the conveyance path, the second region being where the second antenna can communicate with the wireless tags being conveyed along the conveyance path;
a shield configured to block the radio waves from the first antenna to the wireless tags in a middle portion of the first region so the first antenna is unable to communicate with wireless tags in the middle portion of the first region; and
a controller configured to:
select a tag ID read from a wireless tag on the conveyance path via the first antenna as a target tag ID,
designate the target tag ID by communication via the second antenna,
write tag information via the second antenna to the wireless tag corresponding to the designated target tag ID, wherein
the controller selects the target tag ID of a wireless tag that has passed through the middle portion of the first region and was thus temporarily unable to be read via the first antenna from among tag IDs of all the wireless tags read via the first antenna.

2. The wireless tag communication device according to claim 1, wherein the controller is further configured to:

control the first antenna to emit an interrogation wave; and
receive a plurality of response waves from a plurality of wireless tags via the first antenna.

3. The wireless tag communication device according to claim 1, wherein the controller is further configured to:
control the second antenna to emit an interrogation wave designating the target tag ID; and
receive a response wave from the designated target tag via the second antenna in response to the interrogation wave designating the target tag ID.

4. The wireless tag communication device according to claim 3, wherein the controller is further configured to write data to the target tag ID once the response wave from the wireless tag with the designated target tag ID is received.

5. The wireless tag communication device according to claim 1, wherein the wireless tags are radio frequency identification (RFID) tags.

6. The wireless tag communication device according to claim 1, wherein the controller selects the target tag ID based on a number of failed communication attempts to the wireless tag with the target tag ID via the first antenna being above a predetermined threshold.

7. The wireless tag communication device according to claim 6, wherein the wireless tags are radio frequency identification (RFID) tags.

8. A radio frequency identification (RFID) tag communication device, comprising:
a first antenna configured to radiate first radio waves toward a conveyance path for a plurality of RFID tags such that a first communication area is formed along the conveyance path;
a second antenna configured to radiate second radio waves toward the conveyance path such that a second communication area is formed along the conveyance path;
a shield configured to block part of the first radio waves such that first radio waves do not reach a middle portion of the conveyance path otherwise within the first communication area;
a controller configured to:
select a target RFID tag that becomes unreadable via the first antenna during conveyance of wireless tags along the conveyance path within the first communication area when the target RFID tag passes through the middle portion of the conveyance path otherwise within the first communication area; and
write data to the selected target RFID tag via the second antenna.

9. The RFID tag communication device according to claim 8, wherein the controller selects the target RFID tag based on the number of failed communication attempts via the first antenna for the target RFID tag being above a predetermined threshold.

10. The RFID tag communication device according to claim 8, wherein the controller selects the target RFID tag based on a number of communications via the first antenna with the target RFID tag.

11. A wireless tag writing method, comprising:
emitting radio waves from a first antenna towards a first region of a conveyance path for wireless tags;
emitting radio waves from a second antenna towards a second region of the conveyance path on a downstream side of the first region in a tag conveyance direction along the conveyance path;
blocking a portion of the radio waves from the first antenna to a wireless tag in a middle portion of the first region where the first antenna can otherwise communicate with the wireless tags conveyed along the conveyance path;
selecting a tag ID read from a wireless tag on the conveyance path via the first antenna as a target tag ID;
designating the target tag ID by communication via the second antenna; and
writing tag information via the second antenna to the wireless tag corresponding to the designated target tag ID, wherein
the tag ID of a wireless tag that has passed through the middle portion of the first region and thus temporarily could not be read from among tag IDs of all the wireless tags read by communication via the first antenna is selected as the target tag ID.

12. The method according to claim 11, further comprising:
controlling the first antenna to emit an interrogation wave; and
receiving a plurality of response waves from a plurality of wireless tags via the first antenna.

13. The method according to claim 11, further comprising:
controlling the second antenna to emit an interrogation wave designating the target tag ID; and
receiving a response wave from the designated target tag via the second antenna in response to the interrogation wave designating the target tag ID.

14. The method according to claim 13, further comprising:
writing data to the target tag ID once the response wave from the wireless tag with the designated target tag ID is received.

* * * * *